United States Patent [19]

Rudnick et al.

[11] Patent Number: 4,866,120

[45] Date of Patent: Sep. 12, 1989

[54] ELASTOMERIC END DIFUNCTIONAL POLYMERS

[75] Inventors: Leslie R. Rudnick, Lawrenceville, N.J.; Frederick C. Loveless, Yardley, Pa.

[73] Assignee: Mobil Oil Corporation, New York, N.Y.

[21] Appl. No.: 205,126

[22] Filed: Jun. 9, 1988

[51] Int. Cl.$^4$ .............................................. C08G 18/62
[52] U.S. Cl. .............................. 524/849; 252/182.18; 525/331.9; 525/332.5; 525/332.7; 528/75; 528/271; 528/392
[58] Field of Search ....................... 524/849, 852, 854; 525/331.9, 332.5, 332.7; 252/182.18; 528/75, 271, 392

[56] References Cited

U.S. PATENT DOCUMENTS

| | | | |
|---|---|---|---|
| 2,875,917 | 3/1959 | Alkire | 220/46 |
| 2,876,207 | 3/1959 | Henderson | 260/33.4 |
| 4,518,753 | 5/1985 | Richards | 526/177 |

*Primary Examiner*—Maurice J. Welsh
*Attorney, Agent, or Firm*—Alexander J. McKillop; Charles J. Speciale; Howard M. Flournoy

[57] ABSTRACT

Directed to functionalized saturated polymers having elastomeric characteristics and to compositions containing minor amounts thereof and to the process of making them.

18 Claims, No Drawings

ELASTOMERIC END DIFUNCTIONAL POLYMERS

CROSS-REFERENCE TO RELATED APPLICATIONS

This application is related to Ser. No. 205,400 entitled Process of Making Saturated Hydroxylated Hydrocarbon Polymers and filed of even date.

BACKGROUND OF THE INVENTION

This application is directed to functionalized saturated liquid polymers useful for the production of crosslinked elastomeric materials and to compositions containing minor amounts thereof and to a process of making them.

End terminated dihydroxypolybutadienes are known in the prior art. Such polymers commercially available from Arco Specialty Chemicals are unsaturated and contain a microstructure comprises of about 25% 1,2 and about 75% 1,4 butadiene units. Similar polymers available from Colorado Chemical Specialties' are unsaturated and contain at least 80% 1,2-structural units.

U.S. Pat. No. 4,518,753 discloses polymerization of 1,3-dienes to form monofunctionally or difunctionally terminated polymers having enhanced 1,4-content.

SUMMARY OF THE INVENTION

This invention is directed to oxidatively stable elastomeric compositions comprising saturated difunctional end-terminated liquid rubber polymers having at least 25 weight percent of the molecular weight pendant to the backbone and a number average molecular weight of from about 500 to 10,000, and to a process of making same. Accordingly, it is an object of this invention to produce saturated end difunctional liquid polydiene polymers having after saturation a degree of branching sufficient to retain liquidity at low temperature. Hydrogenation of terminally functional high-vinyl polybutadienes results in terminally functional ethylene butene copolymers and hydrogenation of terminally functional 1,4 isoprene leads to terminally functional ethylene propylene copolymers.

DESCRIPTION OF THE SPECIFIC EMBODIMENTS

Any suitable polydiene may be used in this invention. Particularly preferred are $C_4$ to about $C_8$ conjugated dienes and more particularly, butadiene.

The molecular weight of the polydiene, e.g., polybutadiene, may vary from about 500 to about 10,000 or more, depending on the specific intended purpose of the polymer and preferably from about 1,000 to 10,000.

The polymers in accordance with the invention are useful for a variety of purposes. The conjugated 1,3-dienes of the present invention will preferably contain from 4 to 12, especially from 4 to 8, carbon atoms per molecule. Examples of suitable compounds include but are not limited to the following: 1,3-butadiene; isoprene; myrcene; 2,3-dimethyl-1,3-butadiene; 1,3-pentadiene; 2-methyl-3-ethyl-1,3-butadiene; 2-methyl-3-ethyl-1,3-pentadiene; 2-ethyl-1,3-pentadiene; 1,3-hexadiene; 2-methyl-1,3-hexadiene, 1,3-heptadiene; 3-methyl-1,3-heptadiene; 1,3-octadiene; 3-butyl-1,3-octadiene; 3,4-dimethyl-1,3-hexadiene; 3-n-propyl-1,3-pentadiene; 4,5-diethyl-1,3-octadiene; phenyl-1,3-butadiene; 2,3-diethyl-1,3-butadiene; 2,3-di-n-propyl-1,3-butadiene and 2-methyl-3-isopropyl-1,3-butadiene. Among the dialkylbutadienes, it is preferred that the alkyl groups contain from 1 to 3 carbon atoms. Of the above monomers 1,3-butadiene, isoprene, myrcene, 2,3-dimethyl-1,3-butadiene and 1,3-pentadiene are preferred, with 1,3-butadiene being particularly preferred. The conjugated dienes may be polymerized alone, or in a mixture with each other to form copolymers. In addition the above compositions may contain amounts of other anionically polymerizable monomers such as styrene.

The liquid dicarboxy and liquid dihydroxy saturated hydrocarbon polymers are useful as precursor materials for making polyurethanes, and the like. They are also useful as caulking/sealant materials or cureable liquid compositions and as additives in lubricants basestocks for various purposes such as thickening agents, dispersants or VI improvers to provide improved multigrade lubricating compositions. They are also useful as compatibilizing agents in polymer blends.

The general method of preparation of the dicarboxy polydiene of this invention consists of polymerization of the diene under anionic conditions using a difunctional initiator. In the case of butadiene, an agent such as tetrahydrofuran or tetramethylene diamine is used to increase the vinyl content to $\geq 50\%$. Reaction of the resultant dianion with $CO_2$ followed by neutralization results in the desired high-vinyl dicarboxy polymer.

The dihydroxy polydienes are generally prepared as above, except that the polymeric dianion is reacted with an epoxide such as ethylene oxide. Neutralization produces a dihydroxy polymer.

Both the dicarboxy polydiene and the dihydroxy are thereafter hydrogenated under standard conditions and in the presence of a suitable catalyst. Any suitable hydrogenation catalyst may be used, but generally preferred are noble metal catalysts such as platinum or palladium on activated carbon or transition metals such as nickel on Kieselguhr.

The temperature of reaction may vary from about 50 to about 300° C., preferably about 150° C. for vrying periods of time, from about 12 to about 24 hours or more or less, depending on the specific reactants; temperature and pressure. The pressure may vary from about 15 psig to about 2500 psig.

The products in accordance with the invention may be crosslinked if so desired to produce elastomeric materials by a variety of commonly known methods such as with polyvalent metals, epoxides, and isocyanates, as noted below. See for example, U.S. Pat. Nos. 2,876,207 and 2,875,917, and Japan No. 7,247,313.

The following exemplary material is shown merely to illustrate this invention, but not to limit it.

EXAMPLE 1

End-terminated, high-vinyl dihydroxy polybutadiene is prepared as follows: Butadiene (27 grams) is added to a vessel or other suitable reaction zone containing 300 milliliters of anhydrous tetrahydrofuran at $-73°$ C. To this is added 2.7 milliliters of previously prepared THF solution of sodium naphthalene (1.0 molar). The green-black color changes to a deep red color. The reaction mixture is stirred and allowed to warm to $-20°$ C. over two hours. To this stirred mixture is added 2.0 grams (excess) of ethylene oxide. The dark red color immediately disappears. The product is stirred for one (1) hour, and neutralized with diluted hydrochloric acid.

EXAMPLE 2

High-vinyl-polybutadiene prepared as above or obtained through commercial sources was hydrogenated as follows: The polybutadiene (85 grams, 1600 MW) was dissolved in 150 millilters of cyclohexane. To this solution was added 20 millimeters of glacial acid and 1.00 gram of palladium on activated carbon. The mixture was placed in a 300 cc autoclave and reduced with hydrogen (500 psig) at 150° C. for 21.5 hours. After cooling the mixture was filtered, extracted with bicarbonate solution and water, dried over $Na_2SO_4$, filtered and the solvent was removed by distillation. IR was consistent with double bond reduction. The olefinic region was free of absorption indicating that the olefinic linkages had been essentially completely saturated.

EXAMPLE 3

End dihydroxy polyisoprene is prepared in a manner similar to that of polybutadiene in Example 1.

EXAMPLE 4

End dihydroxy saturated polyiosprene derived polymer is prepared by hydrogenation under conditions and in a manner similar to Example 2.

The examples illustrate the preparation of the novel compounds of the invention. No saturated end difunctional liquid rubbers derived from high-vinyl ($\geq 50\%$) polybutadiene are known. The liquids of our invention are also more stable to oxidation than current unsaturated materials. They are readily cureable using known methods, e.g. hydroxy polymers can be cured using titanates; urethanes can be made from hydroxy saturated polybutadienes and polyisocyanates or epoxy cures can be performed on the dicarboxy saturated polybutadienes. The dicarboxy polymers are also curable with polyisocyanates and polyvalent metal salts.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An oxidatively stable, liquid composition comprising a saturated end-terminated difunctional polymer derived from a conjugated diene having two hydroxy or two carboxy groups and having, after saturation, sufficient branching to retain fluidity at low temperatures ranging from about $-20°$ C. to about 25° C. and a number average molecular weight of from about 500 to about 10,000.

2. The composition of claim 1 wherein said composition is a liquid rubber composition.

3. The composition of claim 1 wherein the diene is selected from butadiene and isoprene.

4. The composition of claim 3 wherein said diene is butadiene.

5. The composition of claim 3 wherein said diene is isoprene.

6. The composition of claim 1 wherein said polymer is hydroxy terminated.

7. The composition of claim 1 wherein said polymer is carboxy terminated.

8. A process for producing a saturated liquid polymer having terminal functionality comprising contacting an end functionalized dihydroxy or dicarboxy polydiene with a suitable hydrogenation catalyst under hydrogenation conditions.

9. The process of claim 8 wherein the polydiene is prepared from a conjugated diene containing from about 4 to about 12 carbon atoms per molecule.

10. The process of claim 8 wherein the conjugated diene is 1,3-butadiene.

11. The process of claim 8 wherein the conjugated diene is selected from the group consisting of isoprene, myrcene, 2,3-dimethyl-1,3-butadiene and 1,3-pentadiene or mixtures thereof.

12. An oxidatively stable liquid product comprises of a saturated end-terminated difunctional polymer derived from a conjugated diene having two hydroxy or two carboxy groups and having, after saturation, sufficient branching to retain fluidity at low temperatures ranging from $-20°$ C. to about 25° C. and a number average molecular weight of from about 500 to about 10,000.

13. The product of claim 12 wherein said diene is selected from butadiene and isoprene or mixtures thereof.

14. The product of claim 13 wherein aid diene is butadiene.

15. The product of claim 14 wherein said diene is isoprene.

16. A composition as described in claim 1 wherein said polymer is crosslined with a suitable polyisocyanate.

17. A composition as described in claim 1 wherein said polymer is crosslinked with a suitable polyvalent metal alkoxide.

18. A composition as described in claim 7 wherein said polymer is crosslinked with a suitable polyvalent metal ion.

* * * * *